(12) United States Patent
Pettigiani et al.

(10) Patent No.: US 6,557,772 B1
(45) Date of Patent: May 6, 2003

(54) PREASSEMBLED HEAT EXCHANGE UNIT AND VEHICLE INCLUDING SUCH UNIT

(75) Inventors: Maurizio Pettigiani, Turin (IT); Aurelio Molari, Turin (IT)

(73) Assignee: Denso Thermal Systems Spa, Turin (IT)

( * ) Notice: Subject to any disclaimer, the term of this patent is extended or adjusted under 35 U.S.C. 154(b) by 0 days.

(21) Appl. No.: 09/504,321

(22) Filed: Feb. 14, 2000

(30) Foreign Application Priority Data

Feb. 19, 1999 (IT) ........................................ TO99A0124

(51) Int. Cl.[7] ................................................. B60H 1/02
(52) U.S. Cl. .................................. 237/12.3 B; 454/121
(58) Field of Search ................................ 454/121, 156, 454/103, 104; 237/12.3 A, 12.3 B, 12.3 C; 165/42

(56) References Cited

U.S. PATENT DOCUMENTS

| | | | | |
|---|---|---|---|---|
| 3,289,564 A | * | 12/1966 | De Coye De Castelet | 454/121 |
| 3,327,603 A | * | 6/1967 | De Coye De Castelet | 454/121 |
| 4,726,326 A | * | 2/1988 | Charles et al. | 123/41.49 |
| 4,907,497 A | * | 3/1990 | Danieau | 454/121 |
| 5,217,405 A | * | 6/1993 | Tanaka | 454/121 |
| 5,265,668 A | * | 11/1993 | Fisher | 165/42 |
| 5,632,673 A | * | 5/1997 | Derees | 454/121 |
| 5,673,964 A | * | 10/1997 | Roan et al. | 296/208 |
| 5,803,160 A | * | 9/1998 | Danieau | 165/42 |
| 5,950,711 A | * | 9/1999 | Bendell | 165/42 |
| 6,036,594 A | * | 3/2000 | Kwon et al. | 454/156 |
| 6,059,061 A | * | 5/2000 | Economoff et al. | 180/68.1 |

* cited by examiner

Primary Examiner—Derek Boles
(74) Attorney, Agent, or Firm—Moser, Patterson & Sheridan, L.L.P.

(57) ABSTRACT

Heat exchange unit for vehicles, comprising the components the cooling system of a vehicle internal combustion engine and the components of a system for treating an air flow directed to the passenger compartment of the vehicle. The unit (20) forms a preassembled unit intended to be mounted between the engine (16) and the passenger compartment (12) of a vehicle.

10 Claims, 2 Drawing Sheets

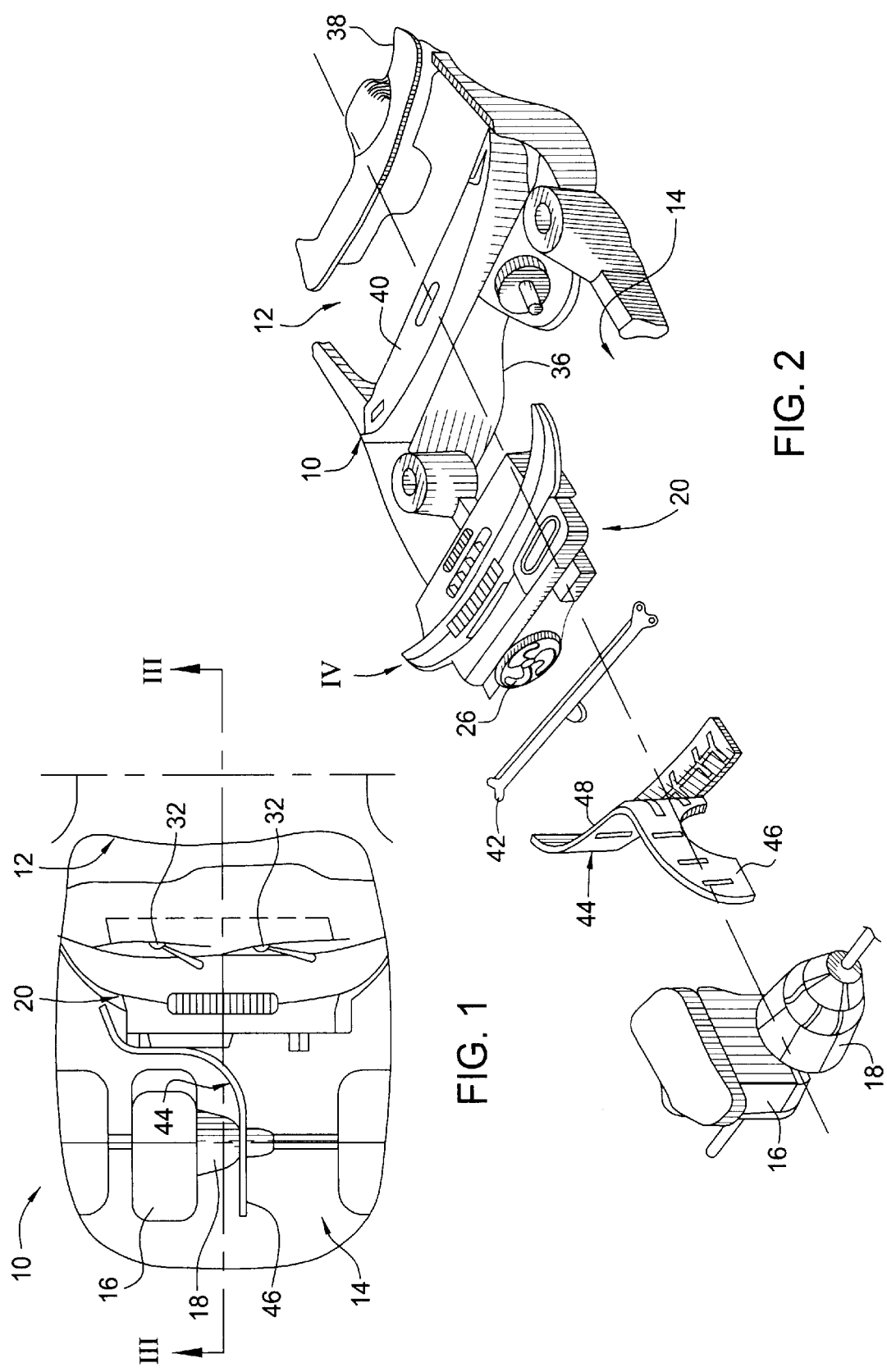

PREASSEMBLED HEAT EXCHANGE UNIT AND VEHICLE INCLUDING SUCH UNIT

The present invention relates to a heat exchange unit for vehicles and to a motor-vehicle including such heat exchange unit.

The invention has been developed in view of the application on motor-vehicles of the type comprising a passenger compartment, an engine compartment placed forwardly of the passenger compartment and an internal combustion engine housed in the engine compartment. Vehicles of this type are normally provided with a first heat exchange unit placed forwardly of the engine, in the frontal portion of the vehicle, and with a second heat exchange unit placed between the engine and the passenger compartment. The first heat exchange unit comprises a radiator for cooling the engine, an electric fan associated with the radiator and, for vehicles with air conditioning, a condenser included in the vehicle air conditioning system. The second heat exchange unit comprises a heat exchanger for heating the air flow intended to be sent to the vehicle passenger compartment, a fan unit for producing the air flow directed in the passenger compartment and a cooler in the case of vehicles with air conditioning system.

Vehicles with a disposition of this type have various drawbacks, a first of which consists in that the components of the heat exchange system placed in the frontal part of the vehicle are subjected to breakage even in case of light front shocks. Furthermore, since in the most recent stylistic solutions the frontal part of the vehicle is constantly lower, the radiators must be lower and wider. Consequently, for creating the space necessary for the headlights it is necessary to increase both the length and the width of the frontal part of the vehicle which projects forwardly of the front axle. The greater dimensions of the frontal part of the vehicle increase the risk of contact with fixed obstacles during manoeuvres. In addition, a greater frontal width of the vehicle does not permit the adoption of an aerodynamic shape, which reduces the aerodynamic drag coefficient (CX). Furthermore, the exhaust manifold of the engine heats the motor of the fan associated with the radiator and it is necessary to leave an empty space between these elements and to introduce a thermal shield. Finally, it is necessary to mount separately two distinct units.

The object of the present invention is to provide a heat exchange unit for vehicles which overcomes the above drawbacks.

In accordance with the present invention, this object is achieved by a heat exchange unit having the features forming the subject of the claims.

Figure 3:
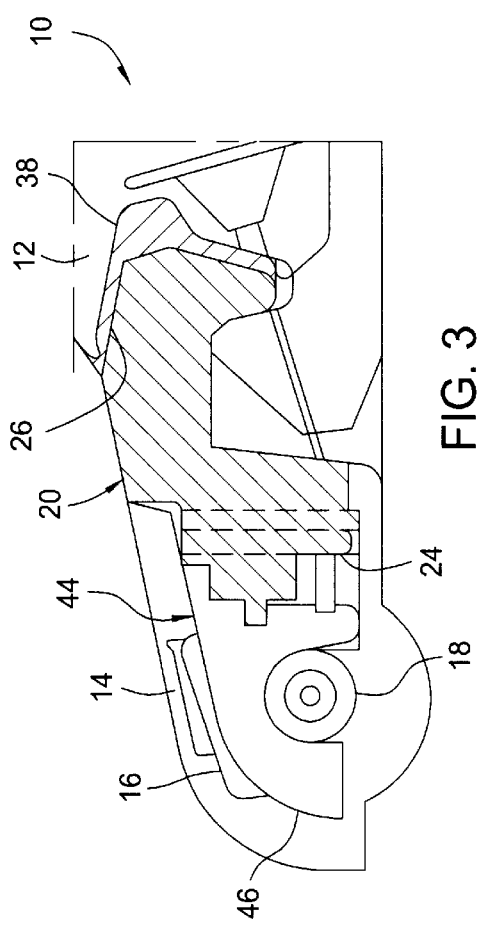
Figure 4:
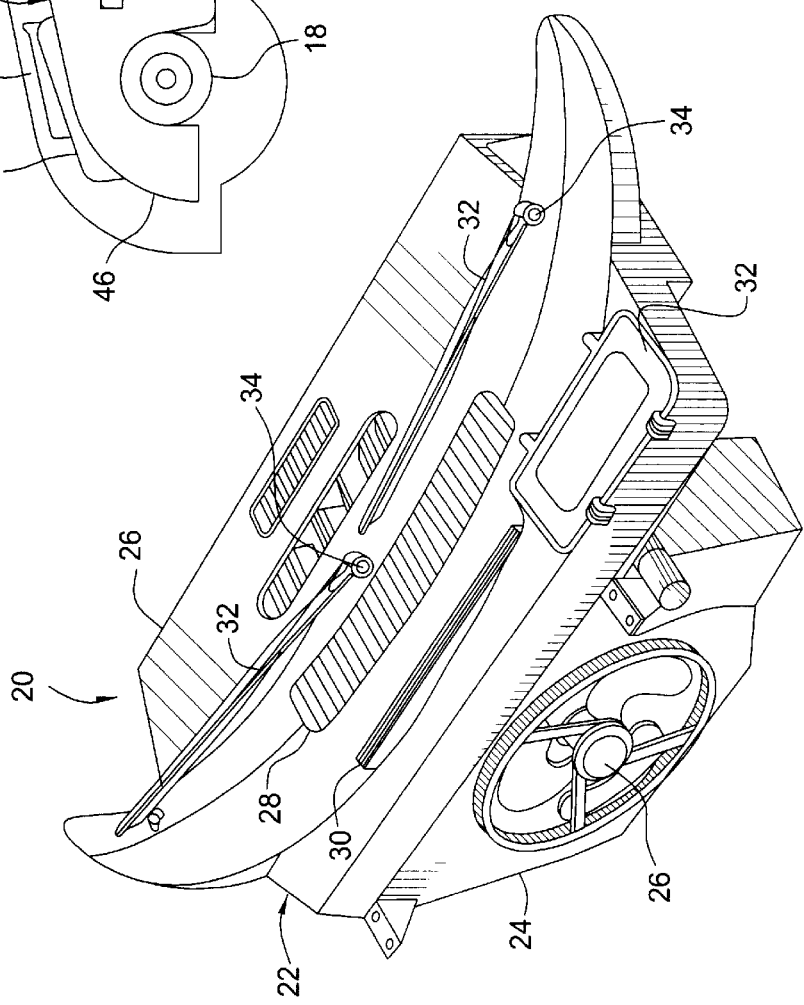

The present invention will now be disclosed in detail with reference to the attached drawings, given purely by way of non-limiting example, in which:

FIG. 1 is a plan schematic view of a vehicle provided with a heat exchange system according to the invention, FIG. 2 is an exploded perspective view of the vehicle of FIG. 1, FIG. 3 is a schematic cross-section taken along the line III—III of FIG. 1, and FIG. 4 is a schematic perspective view of the heat exchange unit indicated by the arrow IV—IV in FIG. 2.

With reference to the drawings, the numeral reference 10 schematically indicates a vehicle comprising a passenger compartment 12 and an engine compartment 14 placed forwardly of the passenger compartment. An internal combustion engine 16 with the respective gearbox 18 is housed in the engine compartment 14.

A heat exchange unit 20 in accordance with the present invention is placed between the engine-gearbox assembly 16, 18 and the passenger compartment 12. The heat exchange unit 20 comprises an outer housing 22 of plastics material in which there are housed the components of the engine cooling system, the passenger compartment heating system and possibly of the air conditioning system. In the embodiment shown in the figures, the heat exchange unit 20 has a front section 24 containing a radiator, a condenser, a dehydrating filter and an electric fan assembly 26. In a rear section 28 of the heat exchange unit 20 there are housed a radiator for heating the air flow directed in the passenger compartment, a cooler, an expansion valve and a centrifugal fan for producing the air flow directed in the passenger compartment. The heat exchange unit according to the preferred embodiment of the invention comprises also an air intake 28, a filter 30 for the air flow directed to the passenger compartment and a filter 32 for the air flow fed to the engine. A windscreen wiper device including a motor, a transmission mechanism and a pair of arms 32 mounted on respective oscillating pins 34 can also be mounted on the housing 22. A reservoir for the windshield and possibly headlights washing liquid and the engine air filter can also be mounted on the unit 20 and turn indicators and rear-view mirrors can be mounted on the outer part of the unit 20.

With reference to FIG. 2, the vehicle body comprises a metal wall 36 which divides the passenger compartment 12 from the engine compartment 14. The wall 36 is continuous and projects towards the passenger compartment. The heat exchange unit 20 is placed between the wall 36 and the engine-gearbox assembly 16, 18. An aesthetical coating 38 of the dashboard is mounted on a sheet metal structure 40. The coating 38 carries the traditional openings for distributing the air flow, the instruments and control and adjustment push-buttons and knobs. The sheet metal structure 40 on which there is mounted the aesthetical coating 38 forms a piping for distributing into the passenger compartment 12 the air flow coming from the heat exchange unit 20.

Referring always to FIG. 2, a cross-member 42 can be provided for supporting the front portion of the heat exchange unit 20 and, at the same time, for stiffening the vehicle body. An element for dividing the air flow 44 can be arranged in front of the heat exchange unit 20 for conveying towards the radiator part of the air flow coming from the front portion of the vehicle. The element 44 may have a longitudinal wall 46 for dividing in two parts the air flow which enters into the engine compartment. The left side of the air flow (with reference to the direction of movement of the vehicle) is sent to the heat exchange unit 20, whereas the right side of the air flow is directed to the engine, the exhaust manifold and the catalytic exhaust pipe. A transversal wall 48 of the element 44 prevents that the flow ok hot air investing the engine 16 reaches the heat exchange unit 20. As shown in FIGS. 2 and 3, the longitudinal wall 46 of the element 44 is preferably arranged so as to rest on the gearbox 18.

The heat exchange unit 20 forms a completely autonomous preassembled unit comprising electric connections and connecting pipes between various components of the thermic systems and forms an integrated thermic system which carries out the functions of engine cooling system, air conditioning system and passenger compartment heating system. Since the heat exchange unit 20 is placed behind the engine 16, its component are protected by shocks on the frontal part of the vehicle and are not damaged as long as the shock does not produce the movement of the engine.

Thus, the heat exchange unit according to the invention permits to obtain a reduction of costs for repairing damages caused by frontal shocks. It permits also a reduction of weight, costs and total dimensions of thermic systems of the vehicle. The heat exchange unit also forms a shield which reduces the transmission of noise from the engine towards the passenger compartment of the vehicle.

The heat exchange unit according to the invention can be designed so that the various components (radiator, condenser, electric fan, etc.) can be removed without having to remove either the engine or the aesthetic coating of the dashboard. The removal of components of thermic systems from the front portion of the vehicle allows the design of vehicles with a lower width of the frontal portion, with a better drag coefficient and gives the designers more freedom for creating new shapes.

Naturally, while the principle of the invention remains the same, the details of construction and the embodiments may be widely varied with respect to what has been disclosed and illustrated without thereby departing from the scope of the present invention.

What is claimed is:

1. A heat exchange unit for a vehicle, comprising:

components of a cooling system for the vehicle's internal combustion engine; and components of an air treatment system for treating an air flow directed to the passenger compartment; and an element for dividing the air flow coming from a frontal part of the vehicle, said element including a longitudinal wall which divides the air flow entering in an engine compartment of the vehicle into two parallel parts between the heat exchange unit and the engine compartment, wherein said heat exchange unit is a preassembled unit for mounting between an engine and a passenger compartment of the vehicle.

2. The heat exchange unit according to claim 1, further comprising the components of a heating system and the components of an air conditioning system of the vehicle.

3. The heat exchange unit according to claim 1, further comprising the components of a windscreen wiper assembly of the vehicle.

4. The heat exchange unit according to claim 1, further comprising an air filter for the internal combustion engine.

5. The heat exchange unit according to the claim 1, further comprising indirect support for a washing liquid reservoir for vehicle headlights.

6. The heat exchange unit according to claim 1, further comprising indirect support for outer rear-view mirrors.

7. The heat exchange unit according to claim 1, further comprising indirect support for lateral turn indicators.

8. A vehicle comprising:

a passenger compartment;

an engine compartment placed forwardly of the passenger compartment;

an internal combustion engine housed in the engine compartment; and a heat exchange unit including the components of an engine cooling system and the components of a system for treating an air flow directed to the passenger compartment of the vehicle, said heat exchange unit being placed between the engine and the passenger compartment; and an element for dividing the air flow coming from a frontal part of the vehicle, said element including a longitudinal wall which divides the air flow entering in the engine compartment of the vehicle into two parallel parts between the heat exchange unit and the engine compartment.

9. A heat exchange unit for a vehicle, comprising:

components of a cooling system for the vehicle's internal combustion engine; and components of an air treatment system for treating an air flow directed to the passenger compartment; and an element for dividing the air flow coming from a frontal part of the vehicle, wherein said element is disposed on a gearbox; and wherein said heat exchange unit is a preassembled unit for mounting between an engine and a passenger compartment of the vehicle.

10. A heat exchange unit for a vehicle, comprising:

components of a cooling system for the vehicle's internal combustion engine; and components of an air treatment system for treating an air flow directed to the passenger compartment; and an element for dividing the air flow coming from a frontal part of the vehicle, said element including a longitudinal wall which divides the air flow entering in an engine compartment of the vehicle into two parallel parts between the heat exchange unit and the engine compartment, wherein said element is disposed on a gearbox; and wherein said heat exchange unit is a preassembled unit for mounting between an engine and a passenger compartment of the vehicle.

* * * * *